(12) United States Patent
Buck et al.

(10) Patent No.: US 12,026,484 B2
(45) Date of Patent: Jul. 2, 2024

(54) AUTOMATED GENERATION OF SOFTWARE APPLICATIONS USING ANALYSIS OF SUBMITTED CONTENT ITEMS

(71) Applicant: Amazon Technologies, Inc., Seattle, WA (US)

(72) Inventors: Rebecca Buck, San Francisco, CA (US); Kenneth Chen, Palo Alto, CA (US); Tatyana Mamut, San Francisco, CA (US); Ian Scott Eslick, San Francisco, CA (US); Paul J. Furio, Seattle, WA (US); Scott Peter Perket, Oakland, CA (US)

(73) Assignee: Amazon Technologies, Inc., Seattle, WA (US)

(*) Notice: Subject to any disclaimer, the term of this patent is extended or adjusted under 35 U.S.C. 154(b) by 3 days.

(21) Appl. No.: 17/811,510

(22) Filed: Jul. 8, 2022

(65) Prior Publication Data

US 2022/0342645 A1 Oct. 27, 2022

Related U.S. Application Data

(63) Continuation of application No. 17/133,021, filed on Dec. 23, 2020, now Pat. No. 11,397,565, which is a continuation of application No. 15/714,466, filed on Sep. 25, 2017, now Pat. No. 10,877,735.

(51) Int. Cl.
| | |
|---|---|
| G06F 9/44 | (2018.01) |
| G06F 8/35 | (2018.01) |
| G06F 8/60 | (2018.01) |
| G06F 8/71 | (2018.01) |
| G06F 8/20 | (2018.01) |

(52) U.S. Cl.
CPC .............. *G06F 8/35* (2013.01); *G06F 8/20* (2013.01); *G06F 8/60* (2013.01); *G06F 8/71* (2013.01)

(58) Field of Classification Search
CPC ..... G06F 8/35; G06F 8/20; G06F 8/60; G06F 8/71
USPC ........................................................ 717/104
See application file for complete search history.

(56) References Cited

U.S. PATENT DOCUMENTS

| | | |
|---|---|---|
| 5,187,788 A | 2/1993 | Marmelstein |
| 5,255,356 A | 10/1993 | Michelman et al. |
| 5,255,363 A | 10/1993 | Seyler |
| 5,371,675 A | 12/1994 | Greif et al. |

(Continued)

FOREIGN PATENT DOCUMENTS

| | | | | |
|---|---|---|---|---|
| JP | 2006325047 | * | 11/2006 | ............. G06F 17/30 |

OTHER PUBLICATIONS

Title: Model-driven design and deployment of service-enabled web applications, author: Manolescu, published on 2005.*

(Continued)

*Primary Examiner* — Qamrun Nahar
(74) *Attorney, Agent, or Firm* — Robert C. Kowert; Kowert, Hood, Munyon, Rankin & Goetzel, P.C.

(57) ABSTRACT

Based on an analysis of example content items, a proposed initial version of an application to be generated on behalf of a client is determined. At least a portion of a software program implementing the application is generated, and an indication of the software program is provided to the client. Based on input received from the client, additional operations associated with the program are initiated.

20 Claims, 10 Drawing Sheets

(56) References Cited

U.S. PATENT DOCUMENTS

| | | | |
|---|---|---|---|
| 5,396,587 A | 3/1995 | Reed | |
| 5,481,692 A | 1/1996 | Ryu et al. | |
| 5,499,371 A | 3/1996 | Henninger et al. | |
| 5,504,848 A | 4/1996 | Yamada | |
| 5,553,215 A | 9/1996 | Kaethler | |
| 5,603,021 A | 2/1997 | Spencer et al. | |
| 5,604,854 A | 2/1997 | Glassey | |
| 5,708,827 A | 1/1998 | Kaneko et al. | |
| 5,893,123 A | 4/1999 | Tuinenga | |
| 6,157,934 A | 12/2000 | Khan et al. | |
| 6,269,473 B1 | 7/2001 | Freed et al. | |
| 6,490,600 B1 | 12/2002 | McGarry | |
| 6,601,234 B1 | 7/2003 | Bowman-Amuah | |
| 6,631,497 B1 | 10/2003 | Jamshidi et al. | |
| 6,691,281 B1 | 2/2004 | Sorge | |
| 6,742,175 B1 | 5/2004 | Brassard | |
| 6,877,155 B1 | 4/2005 | Lindsey | |
| 6,901,579 B1 | 5/2005 | Suguta | |
| 6,988,241 B1 | 1/2006 | Guttman et al. | |
| 7,032,210 B2 | 4/2006 | Alloing et al. | |
| 7,047,518 B2 | 5/2006 | Little et al. | |
| 7,069,499 B1 | 6/2006 | McGarry | |
| 7,225,189 B1 | 5/2007 | McCormack et al. | |
| 7,404,176 B2 | 7/2008 | Reeder et al. | |
| 7,404,177 B1 | 7/2008 | Greenfield et al. | |
| 7,941,438 B2 | 5/2011 | Molina-Moreno et al. | |
| 8,146,000 B1 | 3/2012 | Boliek et al. | |
| 8,327,351 B2 | 12/2012 | Paladino et al. | |
| 8,407,668 B2 | 3/2013 | Lindhorst | |
| 8,812,625 B1 | 8/2014 | Chitilian et al. | |
| 8,938,726 B2 | 1/2015 | Barak | |
| 9,053,083 B2 | 6/2015 | Waldman et al. | |
| 9,710,429 B1 | 7/2017 | Raghunath | |
| 9,734,139 B2 | 8/2017 | Reeves et al. | |
| 9,798,889 B1 | 10/2017 | Karpel et al. | |
| 10,073,844 B1 | 9/2018 | Grzech et al. | |
| 10,191,897 B1 | 1/2019 | Olkin | |
| 10,489,214 B2* | 11/2019 | Joseph | G06F 9/5072 |
| 10,705,805 B1 | 7/2020 | Boswarth et al. | |
| 10,846,469 B2 | 11/2020 | Sobhy Deraz | |
| 10,877,735 B1 | 12/2020 | Buck et al. | |
| 11,063,925 B1 | 7/2021 | Vera et al. | |
| 11,340,893 B2 | 5/2022 | Trevathan | |
| 11,397,565 B2 | 7/2022 | Buck et al. | |
| 2001/0032248 A1 | 10/2001 | Krafchin | |
| 2002/0032901 A1* | 3/2002 | Chessin | G06F 9/44552 717/162 |
| 2002/0065846 A1 | 5/2002 | Ogawa et al. | |
| 2002/0091990 A1 | 7/2002 | Little et al. | |
| 2002/0133368 A1 | 9/2002 | Strutt et al. | |
| 2003/0106040 A1 | 6/2003 | Rubin et al. | |
| 2003/0110191 A1 | 6/2003 | Handsaker et al. | |
| 2003/0110472 A1 | 6/2003 | Alloing et al. | |
| 2003/0144886 A1 | 7/2003 | Taira | |
| 2004/0015368 A1 | 1/2004 | Potter et al. | |
| 2004/0233232 A1 | 11/2004 | Iborra et al. | |
| 2005/0044496 A1 | 2/2005 | Kotler et al. | |
| 2005/0081141 A1 | 4/2005 | Jonsson | |
| 2005/0257196 A1* | 11/2005 | Hollander | G06F 9/45512 717/102 |
| 2006/0015805 A1 | 1/2006 | Humenansky et al. | |
| 2006/0026503 A1* | 2/2006 | Bartosh | G06F 40/143 715/229 |
| 2006/0041543 A1 | 2/2006 | Achlioptas | |
| 2006/0069696 A1 | 3/2006 | Becker et al. | |
| 2006/0136534 A1 | 6/2006 | Boon | |
| 2006/0149740 A1 | 7/2006 | Tsutazawa et al. | |
| 2006/0200748 A1 | 9/2006 | Shenfield | |
| 2006/0224946 A1 | 10/2006 | Barrett et al. | |
| 2007/0016650 A1 | 1/2007 | Gilbert et al. | |
| 2007/0130511 A1 | 6/2007 | Roberge et al. | |
| 2007/0136666 A1 | 6/2007 | Khen et al. | |
| 2007/0244672 A1 | 10/2007 | Kjaer | |
| 2008/0005658 A1 | 1/2008 | Benhase et al. | |
| 2008/0162532 A1 | 7/2008 | Daga | |
| 2008/0270561 A1 | 10/2008 | Tang et al. | |
| 2008/0270980 A1 | 10/2008 | Ahadian et al. | |
| 2008/0275910 A1 | 11/2008 | Molina-Moreno et al. | |
| 2008/0288301 A1 | 11/2008 | Emling | |
| 2009/0006842 A1 | 1/2009 | Ross et al. | |
| 2009/0006939 A1 | 1/2009 | DeSpain et al. | |
| 2009/0037873 A1 | 2/2009 | Ahadian et al. | |
| 2009/0044091 A1 | 2/2009 | Gur | |
| 2009/0070412 A1* | 3/2009 | D'Angelo | G06Q 10/10 709/203 |
| 2009/0118846 A1* | 5/2009 | Eldridge | G05B 19/0426 703/2 |
| 2009/0313245 A1 | 12/2009 | Weyl et al. | |
| 2010/0169759 A1 | 7/2010 | Le Brazidec et al. | |
| 2010/0250497 A1 | 9/2010 | Redlich et al. | |
| 2011/0087954 A1 | 4/2011 | Dickerman et al. | |
| 2011/0113424 A1 | 5/2011 | Ewington et al. | |
| 2011/0209133 A1 | 8/2011 | Mahajan et al. | |
| 2012/0110001 A1 | 5/2012 | Young | |
| 2012/0265758 A1 | 10/2012 | Han et al. | |
| 2013/0013993 A1 | 1/2013 | Oh | |
| 2013/0055058 A1 | 2/2013 | Leong | |
| 2013/0080887 A1 | 3/2013 | Hou | |
| 2013/0086064 A1 | 4/2013 | Salch | |
| 2013/0117651 A1 | 5/2013 | Waldman et al. | |
| 2013/0262986 A1 | 10/2013 | Leblond | |
| 2013/0290822 A1 | 10/2013 | Chen | |
| 2014/0136936 A1 | 5/2014 | Patel et al. | |
| 2014/0157098 A1 | 6/2014 | Maresca | |
| 2014/0164895 A1 | 6/2014 | Matheson et al. | |
| 2015/0040104 A1 | 2/2015 | Mall et al. | |
| 2015/0089344 A1 | 3/2015 | Pickering et al. | |
| 2015/0106782 A1 | 4/2015 | Tuvian | |
| 2015/0142740 A1 | 5/2015 | Behuria et al. | |
| 2015/0169532 A1 | 6/2015 | Otero et al. | |
| 2015/0242199 A1* | 8/2015 | Goldstein | G06F 8/71 717/120 |
| 2016/0041963 A1 | 2/2016 | Coblenz et al. | |
| 2016/0055139 A1 | 2/2016 | Creason et al. | |
| 2016/0142488 A1 | 5/2016 | Adler et al. | |
| 2016/0342582 A1 | 11/2016 | Hiatt | |
| 2017/0032279 A1 | 2/2017 | Miserendino et al. | |
| 2017/0098008 A1 | 4/2017 | Kemmer | |
| 2017/0177621 A1 | 6/2017 | Cardonha et al. | |
| 2017/0178002 A1 | 6/2017 | Moriarty et al. | |
| 2017/0255596 A1 | 9/2017 | Rochelle et al. | |
| 2017/0331915 A1 | 11/2017 | Jann et al. | |
| 2017/0337233 A1 | 11/2017 | Fawcett et al. | |
| 2017/0344901 A1* | 11/2017 | Ronen | H04L 63/1425 |
| 2018/0014076 A1 | 1/2018 | Shanson et al. | |
| 2018/0014077 A1 | 1/2018 | Hou et al. | |
| 2018/0025161 A1 | 1/2018 | Gauthier et al. | |
| 2018/0068666 A1 | 3/2018 | Riedmiller et al. | |
| 2018/0107671 A1 | 4/2018 | Plenos et al. | |
| 2018/0157467 A1 | 6/2018 | Stachura | |
| 2018/0157468 A1 | 6/2018 | Stachura | |
| 2018/0173510 A1* | 6/2018 | Koshkin | G06Q 10/06313 |
| 2018/0181378 A1 | 6/2018 | Bakman | |
| 2018/0242038 A1 | 8/2018 | Harper et al. | |
| 2018/0260373 A1 | 9/2018 | Sobhy Deraz | |
| 2019/0012308 A1 | 1/2019 | Dvorak | |
| 2019/0250891 A1 | 8/2019 | Kumar et al. | |
| 2019/0370322 A1 | 12/2019 | Miller, III | |
| 2020/0092351 A1 | 3/2020 | Chiussi et al. | |
| 2020/0334019 A1 | 10/2020 | Bosworth et al. | |
| 2020/0364400 A1 | 11/2020 | Bosworth et al. | |
| 2021/0019472 A1 | 1/2021 | Dickerman et al. | |

OTHER PUBLICATIONS

Title: Calling the cloud: Enabling mobile phones as interfaces to cloud applications, author: I Giurgiu, published on 2009.*

Lili Mou, et al., "On End-to-End Program Generation from User Intention by Deep Neural Networks," ACM, Oct. 25, 2015, pp. 1-4.

Tao Lei, et al., "From Natural Language Specifications to Program Input Parsers," 2013, In Association for Computational Linguistics (ACL), pp. 1-10.

(56) References Cited

OTHER PUBLICATIONS

Joel Galenson, et al., "CodeHint: Dynamic and Interactive Synthesis of Code Snippets," ICSE'14, May 31-Jun. 7, 2014, ACM 978-1-4503-2756-5/14/05, pp. 653-663.

Amazon web Services, "Amazon Machine Learning, Developer Guide, Version Latest," Copyright © 2017 Amazon Web Services, Inc., pp. 1-153, downloaded Feb. 2, 2017.

"17 Top App Makers to Create Your Own Mobile App—Without a Single Line of Code!," May 16, 2017, downloaded from https://www.websitetooltester.com/en/blog/app-makers/, pp. 1-48.

Mehdi Manshadi, et al., "Integrating Programming by Example and Natural Language Programming," Copyright c 2013, Association for the Advancement of Artificial Intelligence (www.aaai.org), pp. 1-7.

Travis C. Service et al., "Anytime dynamic programming for coalition structure generation", Extended Abstract, 2010, pp. 1411-1412.

Jiang He, et al., "Adaptive User Interface Generation for Web Services", IEEE International Conference on e-Business Engineering, Aug. 14, 2020, pp. 536-539.

KP Gummadi, et al., "Measurement, modeling, and analysis of a peer-to-peer file-sharing workload", Published on 2003, pp. 314-329.

JA Sanchez, et al., AGS: Introducing agents as services provided by digital libraries, Published on 1997, pp. 75-82.

A Machiry, "Dynodroid: An input generation system for android apps", published on 2013, pp. 224-234.

Jan S. Rellermeyer, et al., "R-OSGi: Distributed Application through Software Modularization", Published on 2001, pp. 1-20.

U.S. Appl. No. 15/987,841, filed May 23, 2018, Joseph Rozenfeld, et al.

U.S. Appl. No. 16/367,092, filed Mar. 27, 2019, Joseph Rozenfeld, et al.

Sestoft, P., "Implementing Function Spreadsheets," 2008, ACM, pp. 91-94.

U.S. Appl. No. 15/714,466, filed Sep. 25, 2017, Rebecca Buck et al.

Google, "IMPORTRANGE—Docs editors Help," downloaded from https://support.google.com/docs/answer/3093340 on Oct. 4, 2017, pp. 1-3.

Microsoft, "Overview of Excel tables," downloaded from https://support.office.com/en-us/article/Overview-of-Excel-tables-7ab0bb7d-3a9e-4b56-a3c9-6c94334e492c on Oct. 2, 2017, pp. 1-6.

Microsoft, "Work with hyperlinks in Excel," downloaded from https://support.office.com/en-us/article/Work-with-hyperlinks-in-Excel-7fc80d8d-68f9-482f-ab01-584c44d72b3e on Oct. 3, 2017, pp. 1-9.

"Microsoft Excel 2013 Fundamentals Workshop," pp. 1-52, dated Mar. 3, 2015, University of Pittsburg, retrieved from URL: <https://www.technology.pitt.edu/sites/default/files/documents/migrated/Training/Microsoft%20Excel%202013%20Fundamentals%20Manual.pdf>, 2015.

\* cited by examiner

AUTOMATED GENERATION OF SOFTWARE APPLICATIONS USING ANALYSIS OF SUBMITTED CONTENT ITEMS

This application is a continuation of U.S. patent application Ser. No. 17/133,021, filed Dec. 23, 2020, which is a continuation of U.S. patent application Ser. No. 15/714,466, filed Sep. 25, 2017, now U.S. Pat. No. 10,877,735, which are hereby incorporated by reference herein their entirety.

BACKGROUND

In recent years, more and more software applications are being run using smart phones and other small-footprint devices, or in cloud-based data centers, thereby reducing the need for application owners to maintain expensive application execution environments at their own premises. As application users get accustomed to easy-to-use applications, the pressure on business organizations and governmental entities to make their products and services accessible via such applications increase. Many non-business activities, such as social gatherings and the like, are also increasingly being organized and managed using phone-based or cloud-based applications.

Large well-financed organizations may be able to hire enough programming staff to develop and maintain the applications for various target environments, or outsource the work of developing and maintaining the applications. However, for a "long tail" of relatively small organizations or individuals, the costs associated with developing full-fledged applications may sometimes be prohibitive. For any given application, several different types of programming skills may be required: for example, front-end or user interface design expertise for various types of devices expected to be used for the application, back-end or database skills, security-related expertise, networking skills and so on may all be essential.

For many small organizations, making their unique service and/or product offerings accessible via easy-to-use applications may potentially lead to substantial increases in market size and/or revenue. Some small business owners may have ideas for several different types of application and channels which they would like to try out for delivering their products or services, but may lack programming skills needed to develop the applications themselves. Orchestrating the creation and deployment of such applications may present a non-trivial technical and logistical challenge.

Figure 1:
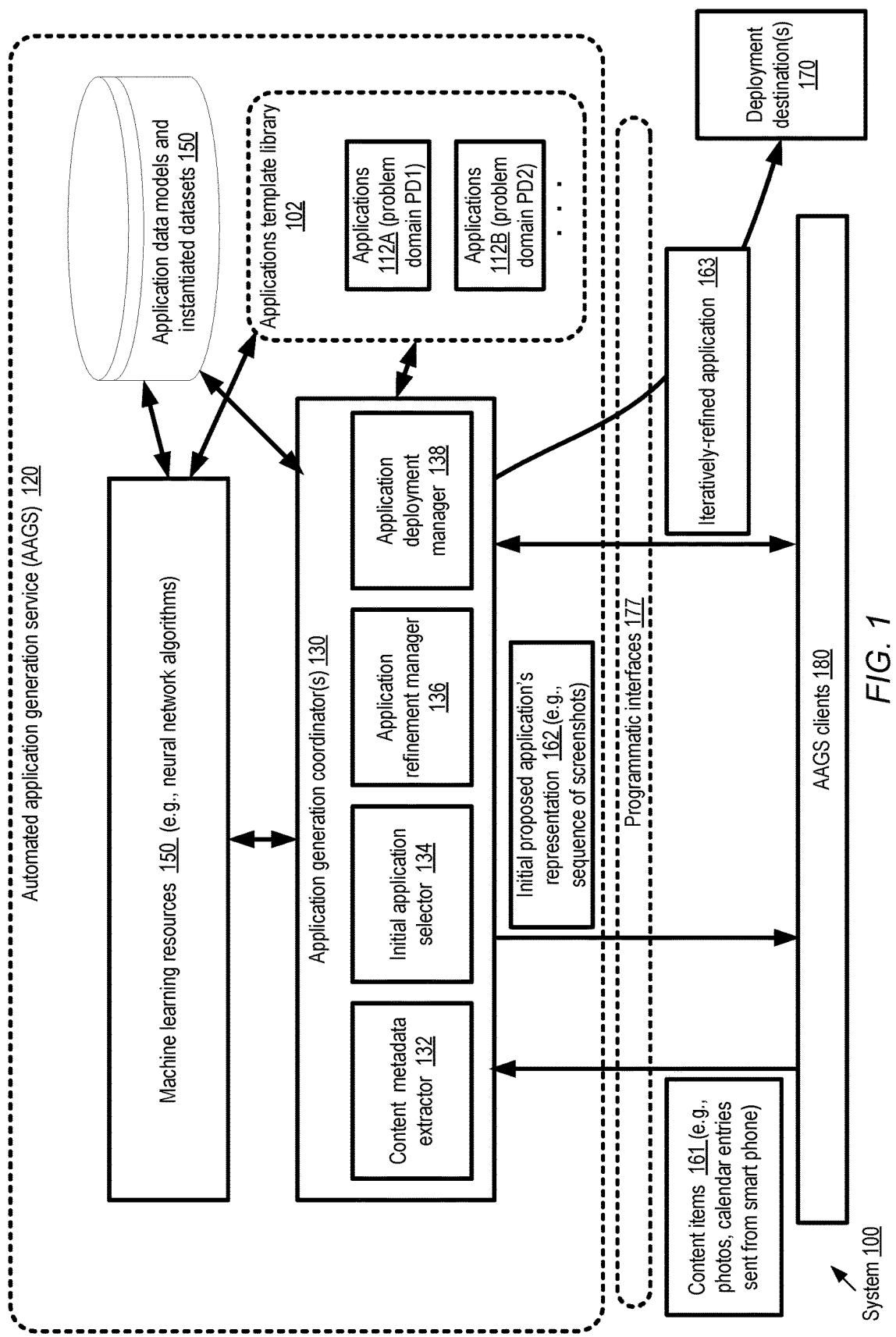
FIG. 1 illustrates an example system environment in which software applications may be automatically generated based at least in part on provided content item examples, without the need for the requester of the application to write program code, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for automated generation and deployment of software applications based at least partly on the analysis of content items indicated by an application requester are described. In at least some embodiments, one or more of the techniques described herein may be implemented at a network-accessible service, which may be referred to as an automated application generation service (AAGS) or an application builder service. A customer or client of such a service, such as a businessperson who may not necessarily be skilled in at least some aspects of software development, but who does have some high-level goals about a potentially useful software application, may utilize the service to generate and/or refine the desired application without writing any software code in various embodiments. The client may begin the process of generating a particular application associated with a problem domain of interest by submitting one or more examples of content items (e.g., photographs, emails, or the like) which may (from the perspective of the client) provide hints or suggestions regarding the desired application to the service. For example, if a client is a hair salon owner or manager who wants to obtain an application associated with scheduling of hair styling appointments, a set of photos of hair styles, and/or of customers having their hair styled or cut in the salon, together with some calendar entries for hair-related appointments, may be submitted to the service. Any of a number of easy-to-use interfaces may be employed to submit the content—for example, interfaces similar to those used for sharing photographs taken on a smart phone with friends may be used, as discussed below in further detail. In at least some embodiments, the individual example content items need not necessarily be annotated in any way by the client—e.g., in the case of photographs submitted to the AAGS, the photographs may be un-enhanced or unlabeled. In other embodiments, some subset or all of the example content items submitted to an AAGS may be annotated or modified prior to submission.

Upon receiving the example content items, components of the service may analyze the content, and using any of various techniques described below such as template matching and/or machine learning, identify respective proposed initial versions of one or more candidate applications which appear to match the client's needs. A given proposed initial version may include one or more potential user interactions—e.g., a user of a hair salon scheduling application may be expected to allow clients to view available appointment slots, select a particular hair treatment and so on. An approximate visual representation of at least some such interactions may be provided by the service for one or more of the candidate applications—e.g., in the form of screenshots of a smart-phone app interface or a web-based interface which may potentially be used for the application.

At this stage, in some embodiments, customized software code for the targeted or desired application may not have been generated at the service, or only a minimal amount need to prepare the approximate visual representation may have been produced. Instead, for example, service components may utilize existing representations of user interactions of application templates or skeletons (or modify such pre-existing artifacts slightly based on the supplied example content items) in various embodiments, with the objective of obtaining an approval of one of the proposals from the client before generating a substantial amount of custom code. In the hair salon scheduling application scenario, for example, thumbnails generated from client-supplied example photographs may be used in a phase of a proposed application in which a particular hair-style is to be selected by a hair salon customer. In effect, the service may be attempting to obtain an answer from the client to a question similar to "does this sequence of interactions look (at least approximately) like the application you want?" in some embodiments. Visual representations of several options corresponding to different candidate applications may be presented to the client in some embodiments, and the client may provide feedback programmatically for the various options until eventually a set of interactions of a particular application is approved by the client. In some cases, the representations presented to the client for approval may comprise at least some non-visual elements—e.g., audio elements may be included in some application representations. (There is, of course, also the possibility that none of the choices presented by the service is acceptable to the client. In one embodiment, in such a scenario, the client may be provided access to a larger set of existing template applications and/or a source code development environment, and requested to either select one of the templates to pursue further service-performed refinements, or to provide at least an initial set of source code for the targeted application.)

After one of the proposed initial versions is approved by the client programmatically based on the presented visual representations, at least a portion of a software program corresponding to an implementation of the approved application may be generated (or retrieved from an existing library of programs) at the automated application generation service (AAGS) in various embodiments. In at least some embodiments, the AAGS or application builder service may maintain a growing repository of application templates, with which a variety of client-specific data sets may be programmatically associated for customization as needed. If the initial requirements for an application, as deduced using the content items and the client's approval of the visual representation, can be met using one of the templates, very little or no additional code may be needed at this stage of the automated application generation process in various embodiments. In other cases, the template versions of the programs may have to be modified at least slightly before being presented to the client, or a new program may have to be generated. An indication of the program (e.g., the name of the program, instructions on how to try the program out it one or more execution environments, and/or a pointer to a client-specific copy of the source code) may be provided to the client in some embodiments.

Depending on the client's goals and the client's evaluation of the initial version of the software program provided by the AAGS, a number of different follow-on operations may be initiated at the service based on requests sent by the client in various embodiments. It may be the case, for example, that the client is satisfied by the first version of the program, and wants to use it as is; in such a scenario, the client may for example either start using the application from an execution platform selected at the service, or request the deployment of the application to a different execution environment (such as a particular smart phone or server selected by the client, or a network-accessible computing service approved by the client). A variety of deployment destination environments may be available in different embodiments, as discussed below in further detail. Alternatively, in at least some embodiments the client may wish to refine the initial version of the program, e.g., by adding to the functionality, modifying the user interface, and so on, in which case the client could submit requests to the service for such changes, and an iterative process of service-generated refinements could be initiated. In some embodiments, the client may obtain access to the source code and perform at least some of the refinement-related changes (e.g., using software development expertise of the client, or of staff hired by the client). A refined version generated by the client may optionally be submitted to the AAGS for deployment at selected destinations in some embodiments. In at least one embodiment, for those clients who may desire to modify the source at any stage of the refinement process, a set of software tools such as an integrated development environment (IDE), additional debugging tools, test resources and the like may be provided by the AAGS. In some embodiments, machine learning algorithms (such as generative neural network based algorithms) may be used to refine applications—e.g., to generate at least a portion of the software for a refined version of an application. In various embodiments, the facilities and interfaces provided by the AAGS may enable clients to obtain access to high-quality applications based largely on intuitive interactions with the service, without a requirement for acquiring proficiency in software development.

Any combination of example content items of a wide variety of content categories may be supplied or indicated to the AAGS to initiate the process of generating an application, and/or during the application refinement process in different embodiments. For example, in some embodiments, photographs, videos, e-mails, contacts database entries, audio recordings, presentations, documents, calendar entries and the like may be provided. In at least some embodiments, pointers to data sources, such as uniform resource identifiers (URIs) of content on the Internet or within a storage service may be provided, e.g., in addition to or instead of the actual content examples.

When submitted content which may potentially be used to trigger the generation of an application is received at the AAGS from a client, in at least some embodiments the AAGS may transmit a confirmation request message to the client, in effect asking the equivalent of the question "do you want this content to be used to generate an application?" Additional actions at the AAGS, such as the identification of a proposed initial version of an application, may be dependent on whether the client confirms that the supplied content is to be used to generate the application. In some embodiments, clients need not submit all the content examples that are to be used at the same time—e.g., clients may submit content items in batches, informing the service programmatically when all the examples have been submitted.

In various embodiments, after the example content items are received, the AAGS may extract metadata from the content and populate at least some entries of a data set to be used for the desired application using the metadata. The data set may represent a concrete or materialized instantiation of a data model (selected by the AAGS) for the targeted application in some embodiments. For example, metadata about the dates at which various submitted photographs were taken may be used to populate a database associated with scheduling events, tags or labels associated with submitted photographs may be used to populate relationship entries in the data set, and so on. The extracted metadata may be used to select (and/or arrange in an estimated order of preference) the candidate applications whose representations are to be presented to the client for approval in some embodiments. As mentioned above, the content itself may be used to populate portions of the visual interaction representations provided to the client in some embodiments. After an initial proposal prepared at the service is approved, the data set may have to be more fully populated in order for the program corresponding to the approved application to work in some embodiments. At least in the initial stages of the interactions with the client, in some embodiments placeholder or dummy values may be generated to fill out one or more entries in the data set to enable the program to function. That is, the data set underlying the application may be populated based on a combination of information supplied by the client (e.g., in the form of metadata of the example content items, or portions of the content itself) and placeholder values selected at the service in at least some embodiments.

The AAGS may support deployment of the generated applications to a variety of destination types, and support a variety of access modes to the application, in different embodiments. For example, in some embodiments, the application may be deployed to small-footprint devices such as smart phones, to virtual or physical servers at a provider network or cloud environment, to non-provider-network servers selected by the client (e.g., servers at client-owned premises), and so on. In at least some embodiments, an application generated using the AAGS may be added to the inventory of an online marketplace or repository of downloadable applications. In some embodiments, respective versions of a given generated application may be created for several different execution environments (e.g., different server and phone operating systems) and deployed as requested by the client.

Example System Environment

FIG. 1 illustrates an example system environment in which software applications may be automatically generated based at least in part on provided content item examples, without the need for the requester of the application to write program code, according to at least some embodiments. As shown, system 100 may comprise various resources and components of an automated application generation service (AAGS) 120, including for example one or more application generation coordinators 130, machine learning resources 150, a data store comprising application data models and instantiated datasets 150 and an application template library 102. The application generation coordinators 130, which may be implemented at one or more computing devices, may orchestrate the process of creating an application on behalf of AAGS clients 180, without requiring the clients to submit application source code. In at least some embodiments, clients 180 may, if they desire to do so, write some portions of the source code or modify service-generated source code to refine the applications generated by the AAGS.

The AAGs may implement a set of programmatic interfaces 177 in the depicted embodiment—e.g., a set of application programming interfaces, a web-based console, a graphical user interface and/or command line tools. In some embodiments, other programmatic interfaces such as integrated development environments (IDEs) may also be implemented for those clients who wish to modify or write source code. A subset of the programmatic interfaces may be used by clients to submit example content items 161 (such as photos, calendar entries and the like) to initiate the creation of applications in various embodiments. In at least some embodiments, the process of providing at least some categories of content items 161 to the AAGS 120 may be simplified by incorporating content submission capabilities into commonly-used interfaces of smart phones and other frequently used devices. For example, a client's smart phone camera application or photo management application may allow the phone's owner to send/share photos or videos to various destinations, and in some embodiments the AAGS may be added as one possible destination for a client 180 (after obtaining the client's "opt-in" consent), making it trivial for a client to submit selected photos without having to use a new, less familiar interface or explicitly invoke the AAGS's APIs from some other program. Similar opt-in extensions enabling easy transfers of content to the AAGS may be incorporated within file-sharing or file system applications, calendar applications, contacts applications, e-mail applications and so on for various types of devices, including for example smart phones, tablet computing devices, wearable computing devices (such as smart watches, augmented reality devices or virtual reality devices), voice-driven personal assistant devices, laptops, deskside or desktop computer systems and the like. In at least some embodiments, the example content items 161 may be submitted in an un-modified form (relative to when the items were created)—e.g. no special annotations, labels or additional guidance regarding how the items are to be used in the desired application may be required. In other embodiments, at least some of the example content items may be annotated, enhanced or modified, e.g., to help the AAGS interpret the significance or intended use of the items with respect to the application. It at least some embodiments, the set of example content items submitted to the AAGS 120 by a client may not include executable program code—instead, the content items may comprise non-executable data objects (such as image files, contacts entries, calendar entries and the like as mentioned earlier) that can be examined or analyzed using executable programs run by components of the AAGS 120.

Upon receiving a set of example application-related content items 161, a content metadata extractor component 132 of the AAGS 120 may analyze the content items. Metadata such as the types or categories of the items (e.g., whether a given item is an image, a video, a text document or the like), associated dates, times, locations and the like may be extracted from the content items in some embodiments, and provided to an initial application selector 134 in the depicted embodiment. In some embodiments, the initial application selector 134 may utilize machine learning resources 150 to identify one or more applications that appear to be potential matches for the client. For example, one or more machine learning models (e.g., deep learning models employing neural networks) may be trained in some embodiments to consume content items and/or associated metadata as input, and generate respective scores for one or more pre-existing template applications of library 102 (such as applications 112A associated with problem domain PD1, or applications 112B associated with problem domain PD2) indicating how well the template applications match inferred objectives or goals of the target application. Some subset of applications 112 with high matching scores may be selected as candidates for further interactions with the client in such embodiments. In some embodiments, machine learning models may be trained to generate the code for new candidate applications based on the input content items, e.g., instead of assigning scores to pre-existing applications. In other embodiments, the initial application selector may itself examine a pre-existing collection of template applications in library 102 and select one or more matching applications, e.g., instead of or in addition to utilizing machine learning resources 150.

Having identified or generated one or more initial candidate applications that may meet the client's target application requirements, the AAGS 120 may provide a visual representation 162 of various user interactions within the candidate application(s) to AAGS clients 180 in the depicted embodiment. The visual representations, which may for example comprise the equivalent of a set of screenshots showing what users of the proposed application may see and do as they interact with the proposed application, may be provided to obtain approval from the client for further development of the application in various embodiments. In at least some embodiments, where possible and appropriate, the client's example content items 161 (or metadata extracted from the content items) may be incorporated within the visual representations—e.g., an example photograph or e-mail address entry provided by the client may be shown in the visual representation.

If the first proposed application is not approved by the client in the depicted embodiment, representations of one or more other applications may be presented to the client, e.g., based on feedback received from the client and/or based on the matching scores generated by the AAGS. Assuming that one of the presented applications is eventually approved, and that the client 180 indicates that initial version of the application needs improvement, a process of iteratively refining the application may be begun in various embodiments. An initial set of source code may be identified or generated as the "starter" or unrefined version of the application, to which modifications are applied based on client feedback. Note that at least in some embodiments, source code need not necessarily be generated or stored on behalf of the client until the client approves the representation of the initial version of the application—source code-related operations may largely or wholly be deferred until after the approval in such embodiments. In other embodiments, the initial information provided to the client may include a pointer to source code for one or more applications.

An application refinement manager 136 may be responsible for interpreting the client's feedback, e.g., using machine learning resources 150 or other analytic tools, and generating modifications to the current version of the source code based on the interpretations. Multiple iterations of feedback-based refinement may be performed in some embodiments, until eventually an acceptable iteratively-refined application 163 is generated. In at least some embodiments, the client 180 may submit requests via programmatic interfaces 177 to deploy the refined application 163 to one or more deployment destinations 170. Such requests may be processed and implemented by an application deployment manager 138 in various embodiments. A number of different deployment destination types 170 may be selected by the client 180 in some embodiments, such as one or more virtual or physical servers of a provider network or cloud environment, a set of non-cloud devices specified by the client, and so on as discussed below. In addition to the deployment destinations, in some embodiments clients may also be able to specify access modes for their deployed applications—e.g., indicating the set of users (or the required roles, capabilities, permissions etc. of users) who are to be allowed to use the application. In various embodiments, during one or more stages of iterative refinement, a client may make modifications to the application source code if desired, and submit the modified source code (or an executable version of the modified source code) to the AAGS. That is, an indication of the current version (or earlier versions) of the source code (e.g., a location within a source code repository) may be provided to a client 180 by the AAGS upon request in various embodiments.

It is noted that while a network-accessible service such as an AAGS 120 may be employed in some embodiments to generate applications on behalf of clients starting with application contextual information in the form of example content items, similar techniques may be employed using a standalone tool in other embodiments. For example, in one embodiment an application builder tool capable of generating applications in a similar manner to that described above may be implemented using one or more computing devices which are not necessarily part of a network-accessible service, and not necessarily affiliated with a network-accessible service.

Example Programmatic Interactions

Figure 2:
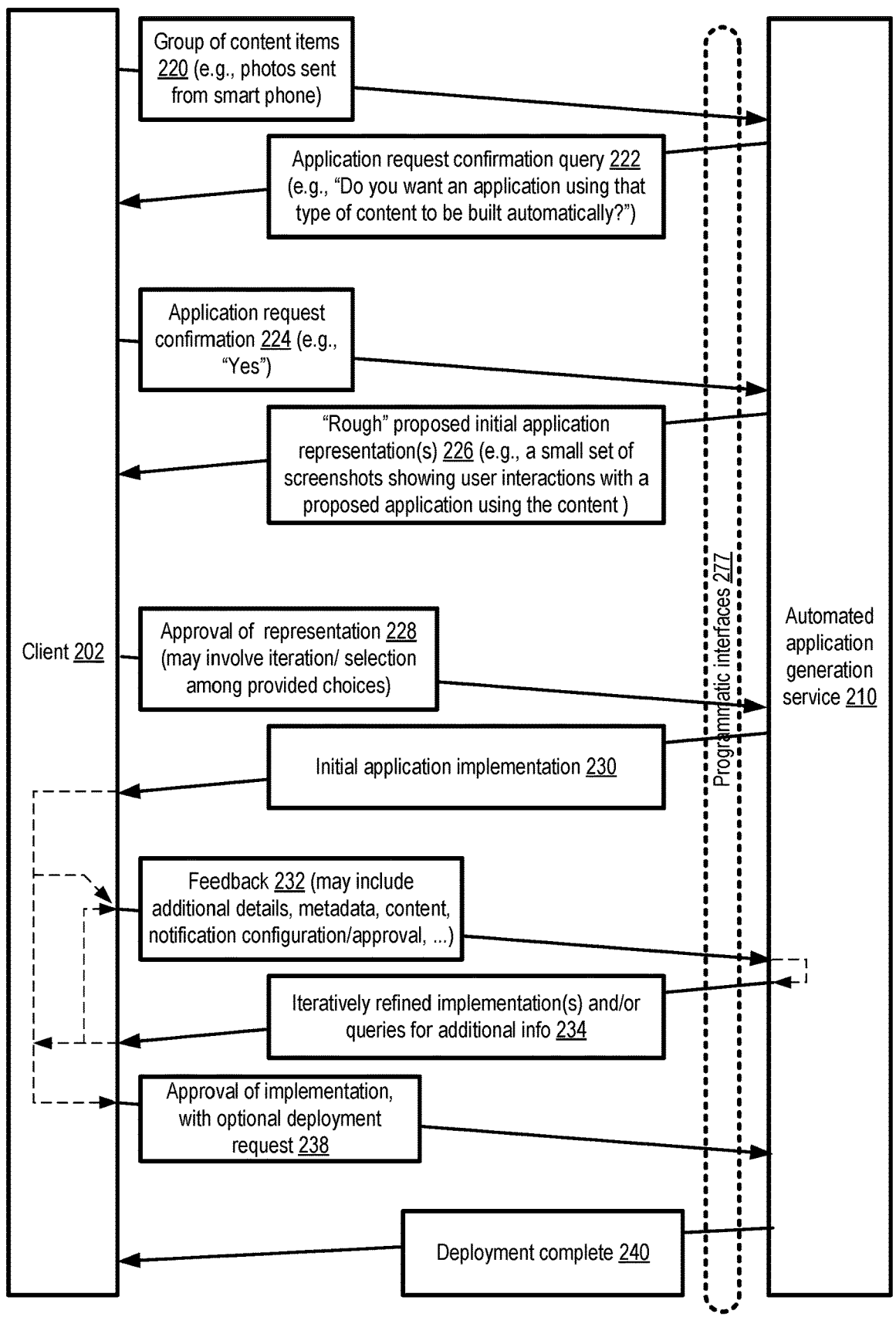
FIG. 2 illustrates an overview of a first example set of programmatic interactions between a client and an automated application generation service, according to at least some embodiments.

FIG. 2 illustrates an overview of a first example set of programmatic interactions between a client and an automated application generation service (AAGS), according to at least some embodiments. An AAGS 210 may implement one or more programmatic interfaces 277 which may be used for such interactions in the depicted embodiment. A client 202 of the AAGS 210 may initially register with the AAGS and obtain the credentials necessary to use the programmatic interfaces 277 in some embodiments. As part of a setup procedure, in some embodiments one or more applications (e.g., for content submission, viewing, trying out and providing feedback of application versions) may be installed on client-owned or client-managed devices. In at least one embodiment, existing applications being used by the client such as a photo-sharing application or a document sharing application may be modified to enable streamlined communication with the AAGS 210. These types of preliminary setup-related interactions are not shown in FIG. 2 (or in FIG. 3, which also illustrates programmatic interactions between a client and an AAGS).

A set of interactions associated with generating and deploying an application may be initiated by the client submitting a group of application-related content items 220 to the service in the depicted embodiment. The AAGS 210 may transmit an application request confirmation query 222 in response to receiving the items, in effect requesting a response to a question similar to "Do you want an application using that type of content to be built automatically?" in some embodiments. Such a confirmation step may be helpful in avoiding the wastage of AAGS resources—e.g., it may sometimes be the case that content is submitted inadvertently, or an incomplete set of content examples is submitted, in which case further processing steps at the AAGS may not be required immediately. Such a conformation may also be helpful in some cases in disambiguating the interpretation of a given example content item. For example, the client could submit a photograph of a pet playing with a toy, and the AAGS may be able to determine that (a) the submission is a photograph (b) the photograph contains a pet and (c) the photograph contains a toy. As such, several object categories that could potentially correspond to operations to be performed in a targeted application may be identified in this example scenario (e.g., pets, toys, or photographs). In some embodiments the AAGS may attempt to confirm which of the categories (or combination of categories) are most relevant to the application targeted by the client.

If the client 202 responds with a confirmation 224 in the depicted embodiment, the AAGS may begin analyzing the set of example content items that was submitted. The content types of the items may be determined, and metadata transmitted along with the content items (or accessible from other sources such as web searched pertaining to the items) may be extracted in various embodiments. Based at least in part on an analysis of the content items and associated metadata, at least one proposed application which may meet the client's requirements may be identified (e.g., from a set of templates) or generated in the depicted embodiment. Other factors may also or instead be used to identify potential applications in some embodiments—e.g., information about the identity of the requesting client may be used, or other information (such as applications generated earlier on behalf of the same client, records which the client has shared with the AAGS regarding applications or devices that the client uses frequently, etc.) pertaining to the client's preferences may be used in various embodiments.

One or more visual representations 226 of typical user interactions of a rough proposed application identified by the AAGS may be transmitted to the client based on the analysis of the content and/or other factors in the depicted embodiment. The example content supplied by the client may be used in the visual representation in some embodiments to the extent possible, e.g., to indicate the manner in which the example content's purposes with respect to the targeted application have been interpreted by the AAGS. The client may eventually approve a proposed rough application, as indicated by interaction 228 in the depicted embodiment. In some cases, the approval may involve several iterations of interactions, in some of which the client indicates that a particular proposal is not acceptable (and/or why the proposal is not acceptable). In one embodiment, the AAGS may generate a list of applications ordered from high to low matching scores with respect to the client's anticipated needs, and provide respective representations of several of the applications of the list at a time, enabling the client to select among (or rank) the proposals.

After the approval 228 is obtained, an indication of an initial application implementation 230 may be provided to the client programmatically in various embodiments—e.g., a link to an executable version of the application may be provided, and/or other instructions as to how to execute or view the application may be provided. In some embodiments, the AAGS may create a client-specific initial source code version of the proposed application program—e.g., by copying/branching the source code from an existing repository of applications, or by generating at least a portion of the source code.

In response to the indication of the initial version of the application, the client 202 may provide feedback 232 (or approval 238) to the AAGS in the depicted embodiment. A number of different types of artifacts or subjective appraisals may be provided by the client as part of the feedback in different embodiments.

In one scenario, the client may find the initial version of the application acceptable as a final version, and the feedback may comprise an approval message 238 with an optional deployment request indicating the execution platforms at which the application should be deployed. In response to such a deployment directive, in various embodiments the AAGS may in some cases take one or more steps necessary to package the application for deployment, initiate the deployment to the specified destinations, and confirm that the requested deployment has succeeded by sending a deployment complete message 240 to the client.

In alternative scenarios, the client may for example try out or examine the application as presented and determine that further refinement is needed in the depicted embodiment. The client may then provide additional information which may be helpful for the refinement: e.g., details regarding the preferred look and feel of the application or the functionality of the application may be provided, additional examples of content or metadata regarding the application may be provided, and so on. In at least some embodiments, information about the configuration of notifications the targeted application should generate (e.g., under what circumstances a user should be notified by the application, what the contents of the notifications should be, and/or what the notification mechanism should be) may be provided by the client, and software code to generate the notifications may be inserted into the application by the AAGS. It is noted that in various embodiments, the feedback artifacts and assessments provided by the client may not require any programming on the part of the client—e.g., options regarding configuration of possible notification mechanisms may be provided in a drop-down menu, and the client may pick one or more of the provided options. Similarly, subjective assessments regarding the current acceptability level of various aspects of the application may be obtained using scores on a scale of 1 to 10, for example, without requiring any code to be written by the client.

Figure 4:
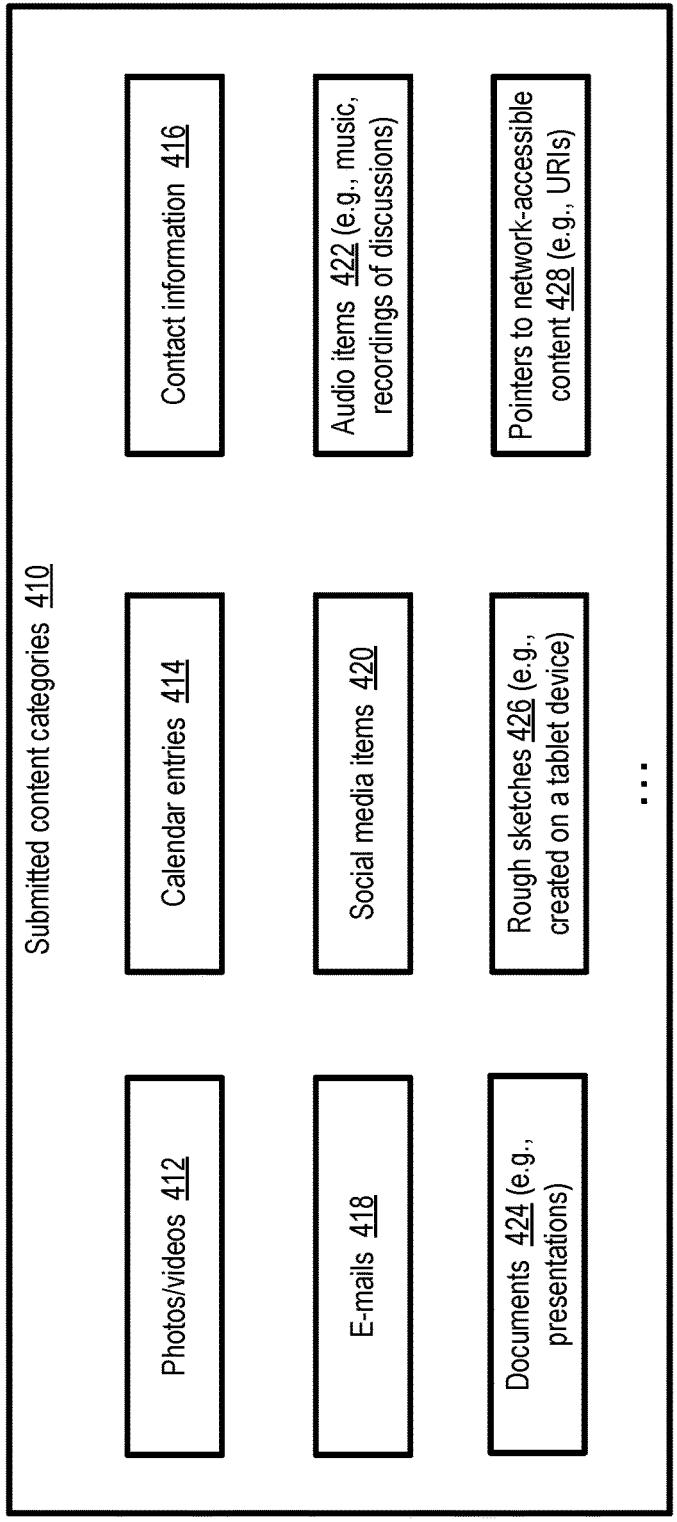
FIG. 4 illustrates example categories of content items which may be submitted as examples to trigger the automated generation of an application, according to at least some embodiments.

As more details or subjective assessments are received at the AAGS, iteratively-refined implementations 234 of the application may be generated and indications of the improved versions may be provided to the client in the depicted embodiment. In some cases, the AAGS may submit queries for additional information to help guide the refinement changes. In various embodiments, the source code of the application may be modified at the service during the refinement iterations (some scenarios in which clients may participate in source code manipulation or creation are illustrated in FIG. 4 and discussed in further detail below). Eventually, an acceptable version of the application implementation may be attained, and an approval message 238 may be sent to the AAGS by the client. The approved version of the application may be stored in a repository by the AAGS in various embodiments. If/when the client wishes to deploy the application, a deployment request may be submitted programmatically, e.g., providing details of the destinations. In response to such a deployment request, the AAGS 210 may package the application appropriately and transmit it to the requested destinations in various embodiments, indicating to the client that the deployment is complete via a message 240.

It is noted that the kinds of programmatic interactions indicated in FIG. 2 may represent only a subset of the supported programmatic interaction types of an AAGS 210 in various embodiments. For example, additional types of interactions may be supported for reporting defects, having defects fixed by the service, adding features to applications, and so on in various embodiments. In at least some embodiments, some or all of these interactions may also be handled using easy-to-use interfaces which do not require source code to be written by the client, and which do not require clients to have expertise in software development/maintenance processes. In at least one embodiment, not all the interactions between a client and an AAGS may involve the use of the same device at the client's end—e.g., photos and contact information may be submitted to the AAGS 210 via the client's smart phone, while AAGS-provided representations of the application may be viewed by the client using a desktop or laptop with a larger display than the phone, source code modifications may be performed by the client using a laptop/desktop, and so on. The client 202 may switch between different devices for interacting with the AAGS 210 as and when desired in such embodiments. In some embodiments, the AAGS may retain session information (e.g., indicating state information for the most recent interactions with a client 202), so that a session may be resumed from any of various client devices.

Figure 3:
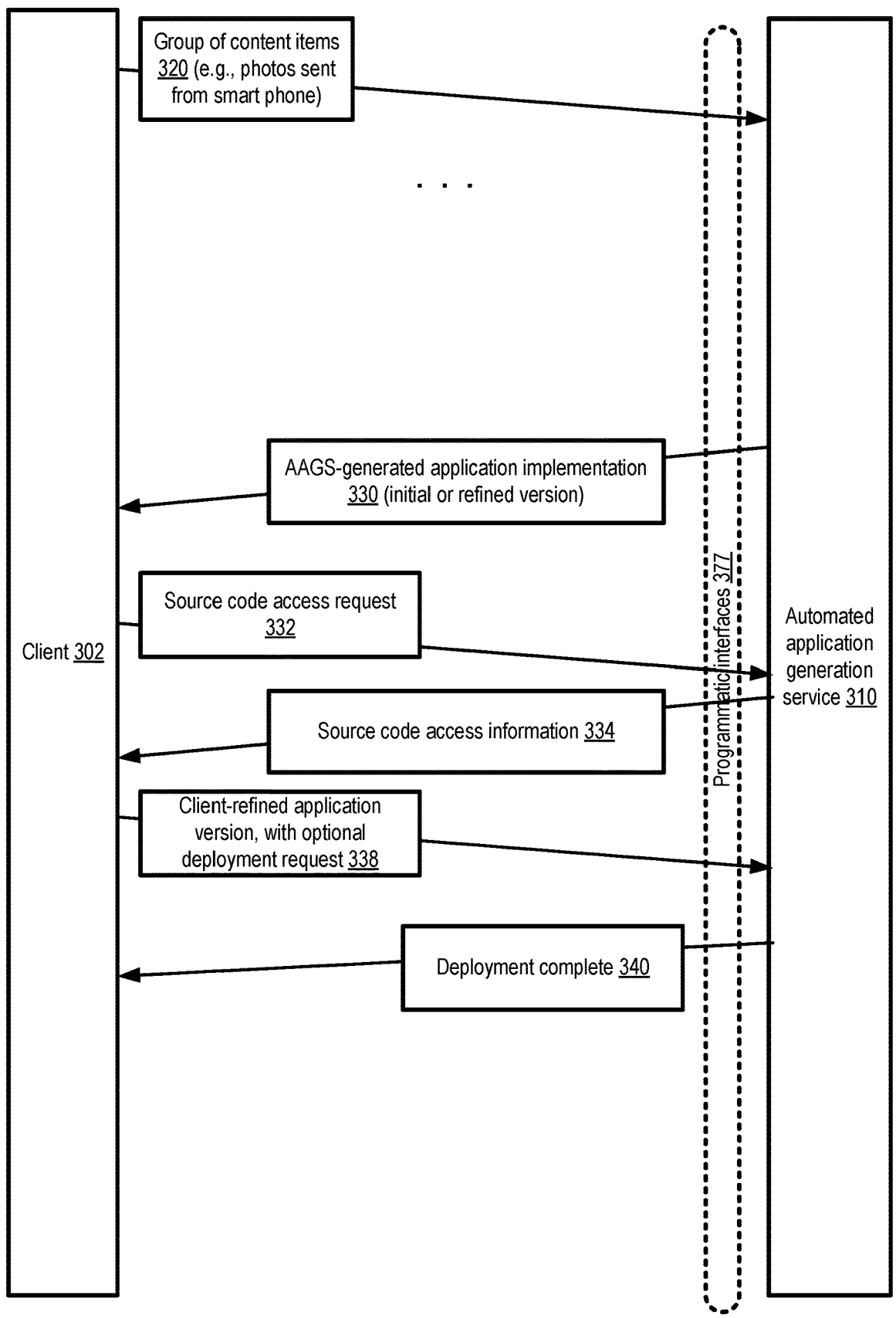
FIG. 3 illustrates an overview of a second example set of programmatic interactions between a client and an automated application generation service, during which the client is granted access to a source code version of a generated application, according to at least some embodiments.

In some cases, clients of an AAGS (or employees/consultants of clients) may modify source code of an application generated by the AAGS. FIG. 3 illustrates an overview of a second example set of programmatic interactions between a client and an automated application generation service, during which the client is granted access to a source code version of a generated application, according to at least some embodiments. As in the example scenarios shown in FIG. 2, the process of automated creation of a desired application may be initiated by a client 302 by sending a group of one or more content items 320 (such as photos sent from a smart phone) to an AAGS 310 using programmatic interfaces 377.

An initial set of interactions similar to those illustrated in elements 222, 224, 226 and 228 of FIG. 2 may occur in response to the submitted content, during which approval of an initial proposed application is obtained from the client using visual representations of user interactions. (This initial set of interactions is not replicated on FIG. 3.) After the approval of the application is obtained, an indication of an AAGS-generated application implementation 330 (either the initial version or some refined version) may at some stage be provided to the client 302 in the embodiment depicted in FIG. 3. In at least some embodiments, access to the source code of the application may not be provided to clients by default.

The client 302 may submit a source code access request 332 corresponding to some specified version of the application (e.g., the most recent version) in some embodiments. In response, the AAGS 310 may provide source code access information 334—e.g., the credentials to access a portion of a source code repository containing the specified version of the code. In at least some embodiments, the AAGS 310 may also provide access to source code processing tools at the request of the client—e.g., one or more IDEs, debuggers, test frameworks and the like may be supported.

The client may modify the source code as desired and, in turn, provide an indication of a client-refined application version 338 in the depicted embodiment. If the client-refined application is the final version (e.g., if the client does not want any additional service-performed refinements), an optional deployment request may be transmitted as well. The AAGS may package and deploy the application as requested, and transmit a deployment completed message 340 back to the client.

In at least some embodiments, once the final version of the application is generated and approved, a client may not necessarily want the AAGS to handle deployment or any further actions. Instead, for example, the client may obtain access to the application (the source code version and/or one or more executable versions for respective types of execution platforms) if such access has not already been provided, and perform any additional follow-up actions needed. In some embodiments, at the request of a client, the AAGS may generate multiple versions of the same application compatible with, and/or optimized for, different operating environments (e.g., different operating systems, virtualization environments and so on) or different locales/geographies.

Submitted Content Categories

FIG. 4 illustrates example categories of content items which may be submitted as examples to trigger the automated generation of an application, according to at least some embodiments. As shown, the categories of submitted content items may include photographs or videos 412, calendar entries 414, contact information 416 (e.g., names, email addresses and the like), e-mails 418, social media items 420 (such as status updates) in at least some embodiments. Audio items 422 (such as songs, other forms of music, recordings of discussions or speeches), documents 424 such as presentations, technical papers and the like, rough drawings or sketches 426 (e.g., sketched on a tablet device), and/or pointers 428 to network-accessible content (e.g., URIs of videos or the like which may be hard to transmit in full) may be submitted to the AAGS in some embodiments. For each of the supported content categories, the AAGS may comprise components capable of recognizing the categories and identifying a set of metadata slots pertaining to the category. For example, with respect to photographs, the metadata slots may include timestamps at which the photographs were taken, geographical location, primary subject matter, properties (e.g., approximate age, etc.) of individuals/items photographed, and so on. The metadata included with the content items may be extracted and used to fill at least some of these slots in various embodiments. Analytics algorithms, such as image recognition and other machine learning algorithms, may be used to fill out other slots in some embodiments. The clients may be queried to determine contents of some slots in at least one embodiment.

In at least one embodiment, the AAGS may support one or more transformation algorithms associated with the submission of example content items. For example, a filter for removing or obfuscating potentially sensitive information may be provided in some embodiments. Such a filter, if activated by a client or by default, may try to detect whether the content items being submitted may comprise financial or other private information (e.g., bank information, home addresses, mobile phone numbers, or the like) which a client may not necessarily wish to expose. If such sensitive items are detected, the client may in some embodiments be asked to confirm whether the information is acceptable without modification for further analysis by the AAGS, whether the information should be obfuscated, or whether the information should be removed from the set of information on which further processing is to be initiated. In at least some embodiments, privacy settings controlled by the clients may be used to manage sensitive information—e.g., the AAGS may enable clients to select or define the kinds of information to be considered sensitive, the actions to be taken if/when such information is detected, and so on.

Application Data Set Population

Figure 5:
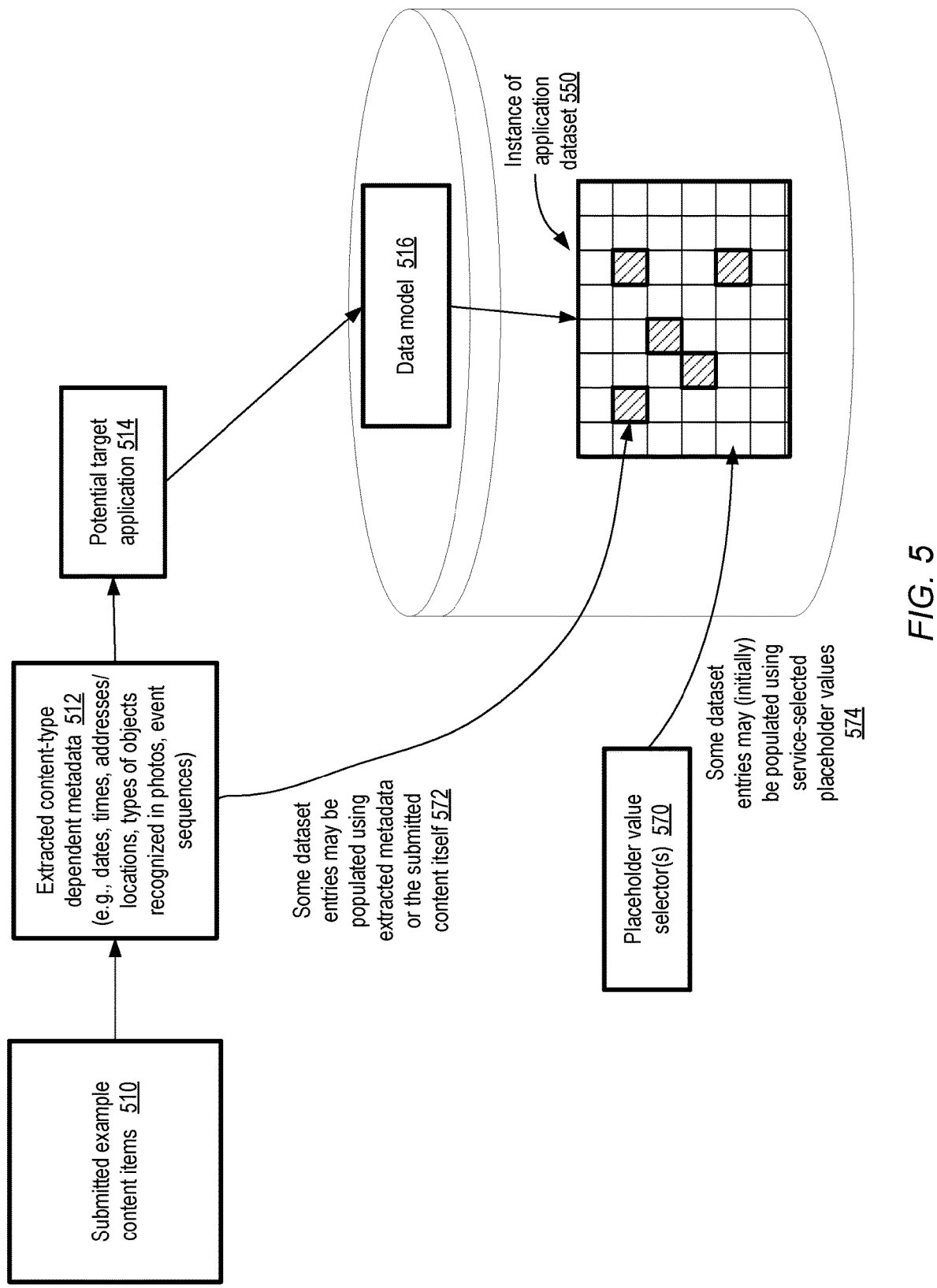
FIG. 5 illustrates aspects of populating entries of a data set used for an application, based at least in part on submitted content item examples, according to at least some embodiments.

In various embodiments, an application generated with the help of an AAGS may have an associated underlying data model, and a data set representing a concrete instance of the data model may have to be generated and maintained for the application. FIG. 5 illustrates aspects of populating entries of a data set used for an application, based at least in part on submitted content item examples, according to at least some embodiments. In the depicted embodiment, metadata 512 may be extracted from submitted example content items related to a target application. The kinds of metadata extracted may differ from one submitted item to another—e.g., different metadata may be extracted from an image than from an email or a calendar entry. Examples of the content-type dependent metadata 512 may include, among others, dates, times, addresses/locations (e.g., Global Positioning System or GPS coordinates), the types of objects recognized in photos, event sequences, etc. Using the extracted metadata, a potential target application 514 and an associated data model 516 for which a concrete instantiation or materialized data set is to be populated may be identified. In some embodiments, as mentioned earlier, the potential target application may be identified by matching at least a portion of the extracted metadata with respective records of application metadata requirements for some number of template applications stored at the AAGS. For example, for each template application, the AAGS may store a description record indicating the kinds of content or objects that are manipulated in the template application, the sequence in which the objects are manipulated, the kinds of transformations which result from the manipulations, and/or the corresponding data model for objects accessed/manipulated in the application. After metadata for a newly-submitted set of content items 510 is extracted, in such an embodiment a similarity detection algorithm may be run, with the extracted metadata and the saved description records of various template applications as input, to identify the template applications (if any) whose object metadata is most similar to the submitted metadata. One or more similar applications found using the analysis (e.g., applications whose object metadata similarity scores with respect to the extracted metadata exceed a threshold) may be selected as candidates whose representations are provided to the client as candidates. In other embodiments, instead of or in addition to such similarity analyses, machine learning models may be used to identify potential target applications 514.

An instance of a data set 550 corresponding to the data model, e.g., similar to an initially-empty spreadsheet or an initially empty database, may be created in the depicted embodiment. In some embodiments, the data set may be materialized as soon as the potential target application 514 is identified, while in other embodiments the data set may not be created until the client approves an application representation presented by the AAGS. In the depicted embodiment, metadata 512 obtained from the initial example content items 510 (and/or portions of the submitted content itself) may be used to fill some of the empty slots or entries in the instance 550, as indicated by arrow 572. Other entries of the data set may initially be populated with placeholder or dummy values, as indicated by arrow 574 in various embodiments. At least some of the placeholder values may be needed for the application to work in some embodiments—that is, without a populated concrete instance of the data model 516, the application may not function properly in such embodiments. In some embodiments, the AAGS may comprise one or more placeholder value selectors 570, which are responsible for generating reasonable placeholder values which (a) enable the application to function properly and (b) are logically compatible with the entries of the data set which were populated using the supplied content items. For example, if the application deals with scheduling soccer games, and a placeholder value for the data set is to indicate a result of a soccer game to be e-mailed to some users, a placeholder result value of "2-0" or "3-1" may be more appropriate than a basketball-like score of "75-52". In at least some embodiments, machine learning algorithms may be used to generate one or more placeholder values.

In various embodiments, during the course of further interactions with the client, as the application is being refined, some or all of the placeholder values may gradually be replaced using additional data or data sources indicated by the client (e.g., in response to queries from the AAGS). These changes may result in making the instantiated data set 550 more and more representative of the real-world usage scenarios anticipated for the application in such embodiments. In some embodiments, during the process of application refinement, the client may indicate third-party data sources (such as various types of publicly-accessible databases or encyclopedia sections accessible over the Internet) which can be used to populate various entries of the data set.

Example Applications

Figure 6:
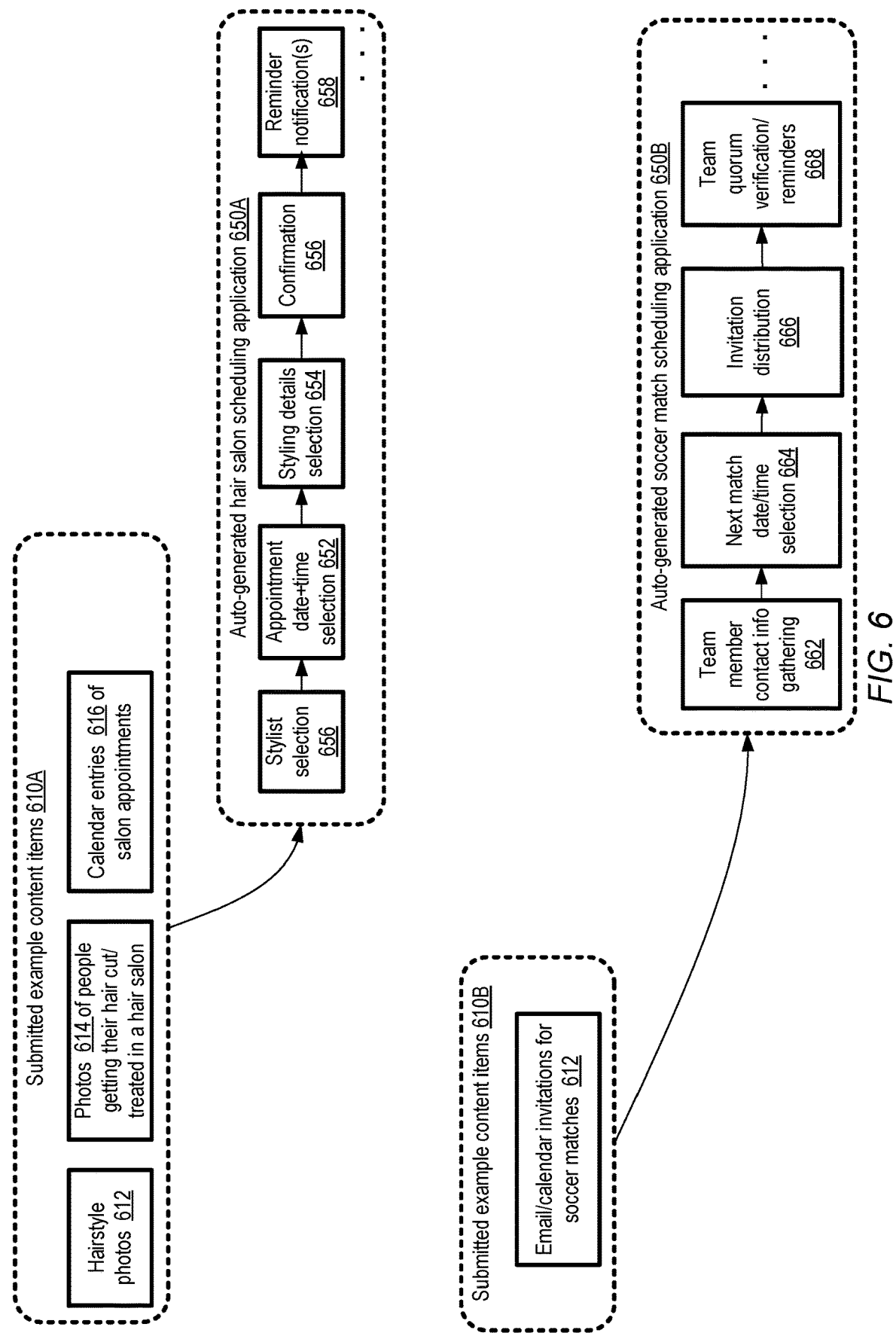
FIG. 6 illustrates aspects of two simple applications which may be generated based on respective sets of submitted example content items, data records which are recommended for label disambiguation, according to at least some embodiments.

FIG. 6 illustrates aspects of two simple applications which may be generated based on respective sets of submitted example content items, data records which are recommended for label disambiguation, according to at least some embodiments. In the first example, a client interested in developing a hair salon scheduling application may submit example content items 610A, comprising a set of hairstyle photos 612, photos 614 of people getting hair treatments in a hair salon, and a set of calendar entries 616 showing hair salon appointments. In response to the submitted content items 610A, the AAGS may for example use metadata extracted from the items to identify a template of an appointment scheduling application, submit a visual representation of the application, get it approved by the client, generate a starter version of the application and then gradually refine the application to tailor it to the hair salon context in the depicted embodiment. Eventually, at some stage of the refinement, a version 650A of the automatically-generated hair salon scheduling application may be obtained, comprising at least the five types of high-level user interactions shown in FIG. 6: a stylist selection interaction 656, an appointment date and time selection interaction 652, a styling details selection interaction 654, an appointment confirmation interaction 656, and one or more reminder notifications(s) 658. Each of the individual high-level interactions may comprise one or more lower-level interactions in the depicted embodiment.

In some cases, very few example content items may have to be provided for the AAGS to deduce the type of application which is to be generated on behalf of the client. In the second example scenario shown in FIG. 6, a few email or calendar invitations for soccer matches (e.g., of a city league or students of one or more schools) may be submitted as example content items 610B. In response, the AAGS may determine that an application for scheduling and coordinating soccer matches is to be generated. The user interactions included in the application at some stage of refinement may comprise, for example, a team member contact information gathering interaction 662, a next match date and time selection interaction 664, an invitation distribution interaction 666, and a team quorum verification with associated reminder notification interactions 668 in the depicted embodiment. It is noted that simplified versions of the example applications are shown in FIG. 6 to avoid clutter, and that in practice a given automatically generated application may comprise a much larger set of interactions in various embodiments.

Provider Network Environment

Figure 7:
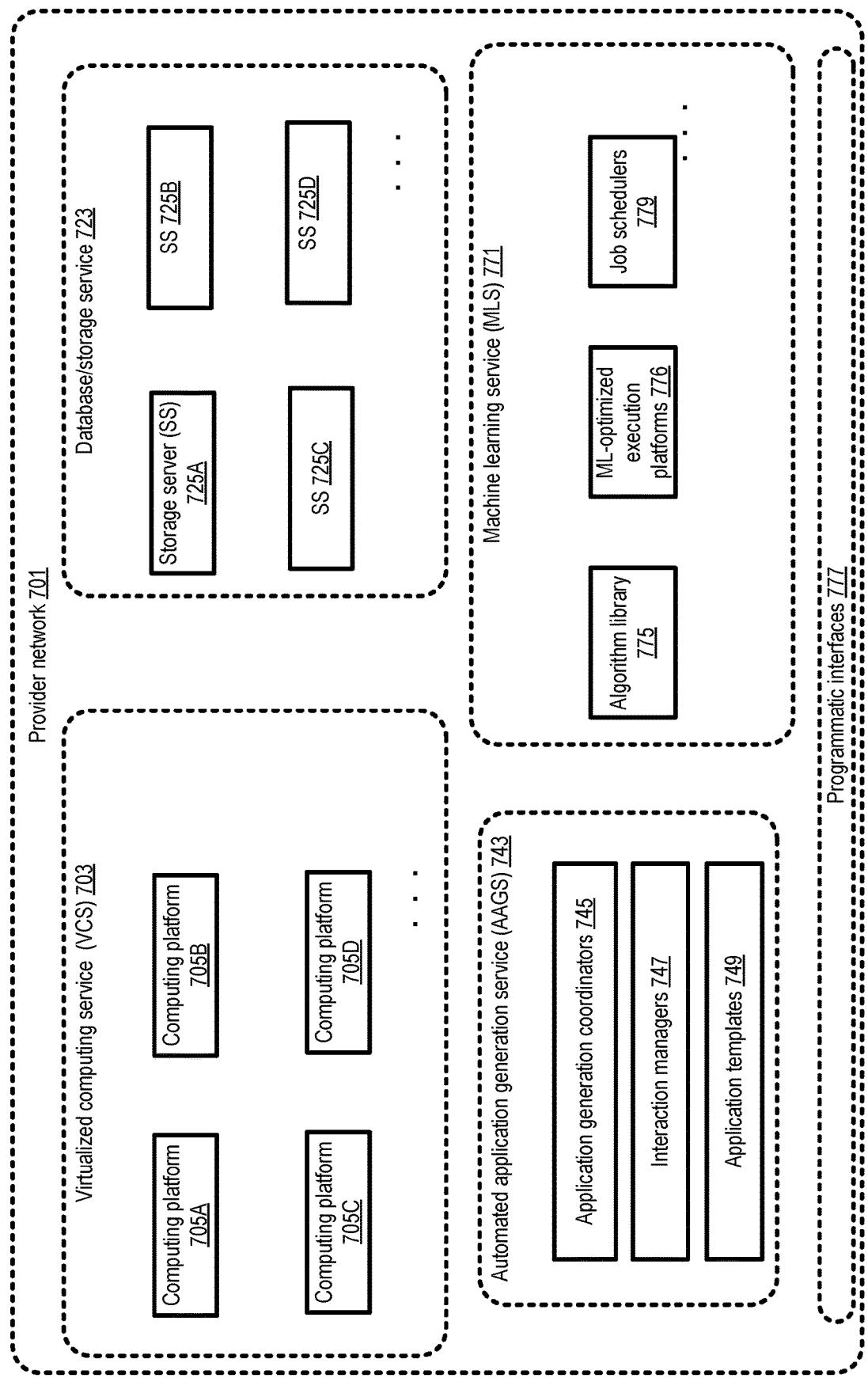
FIG. 7 illustrates an example provider network environment in which an automated application generation service may be implemented, according to at least some embodiments.

In some embodiments, software applications may be generated automatically using resources of a provider network. FIG. 7 illustrates an example provider network environment in which an automated application generation service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 701 may comprise resources used to implement a plurality of services, including for example a virtual computing service 703, a database or storage service 723, a machine learning service 771, and an automated application generation service 743. Components of a given service may utilize components of other services in the depicted embodiment—e.g., for some machine learning tasks, a component of the machine learning service 771 may utilize virtual machines implemented at computing platforms such as 705A-705D of the virtualized computing service, data sets for applications generated at the AAGS 743 may be stored at database/storage service 723, computing platforms of the VCS may be used as deployment destinations for applications generated at the AAGS, and so on. Input data, intermediate results, final results and/or other artifacts of various machine learning algorithms or models, some of which may be employed by the AAGS 743, may be stored at storage servers 725 (e.g., 725A-725D) of the database or storage service 723 in some embodiments. Individual ones of the services shown in FIG. 7 may implement a respective set of programmatic interfaces 777 which can be used by external and/or internal clients (where the internal clients may comprise components of other services) in the depicted embodiment.

As shown, the AAGS 743 may comprise, among other components, one or more application generation coordinators 745, interaction managers 747 and/or a set of application templates 749 in the depicted embodiment. The application generation coordinators 745 may, for example, invoke algorithms selected from the machine learning algorithm library 775 to identify candidate applications corresponding to example content items submitted by clients, analyze various types of feedback provided by clients via programmatic interfaces 777 as applications are refined, and so on. The interaction managers 747 may (as indicated by their names) coordinate programmatic interactions with clients of the AAGS as well as other provider network services in the depicted embodiment. In some embodiments, as mentioned earlier, when an application based on submitted example content items is to be generated or identified by the AAGS on behalf of a client, metadata extracted from the submitted content items may be compared to metadata associated with content of various template applications 749, and one or more of the template applications may be selected as initial versions of the desired applications. In some implementations, at least a portion of a library of template applications may be stored at a database/storage service 723, and may be accessed from the database/storage service as needed at the AAGS 743. In some embodiments, the machine learning service may support both batch jobs (handled by a batch job scheduler 779 which allocates resources for the jobs and manages dependencies among jobs) and shorter real-time tasks. In at least one embodiment, the machine learning service 771 may have access to or include a set of execution platforms 776 that are optimized for machine learning tasks (e.g., platforms that have customized hardware such as GPU arrays and/or customized software stacks). Depending on the suitability of such platforms for the machine learning tasks needed for automated application generation, one or more execution platforms 776 may be employed on behalf of the AAGS 743 in the depicted embodiment.

In at least some embodiments, at least some of the techniques discussed above for generating applications without requiring source code to be supplied by clients may be accomplished using non-specialized computing platforms of the virtualized computing service 703. As mentioned earlier, the techniques for automated generation of applications may be implemented without acquiring resources of network-accessible services such as those shown in FIG. 7 in at least some embodiments. For example, a standalone tool implemented at one or more computing devices which are not part of a network-accessible service may be used in some embodiments.

Deployment and Access Options

Figure 8:
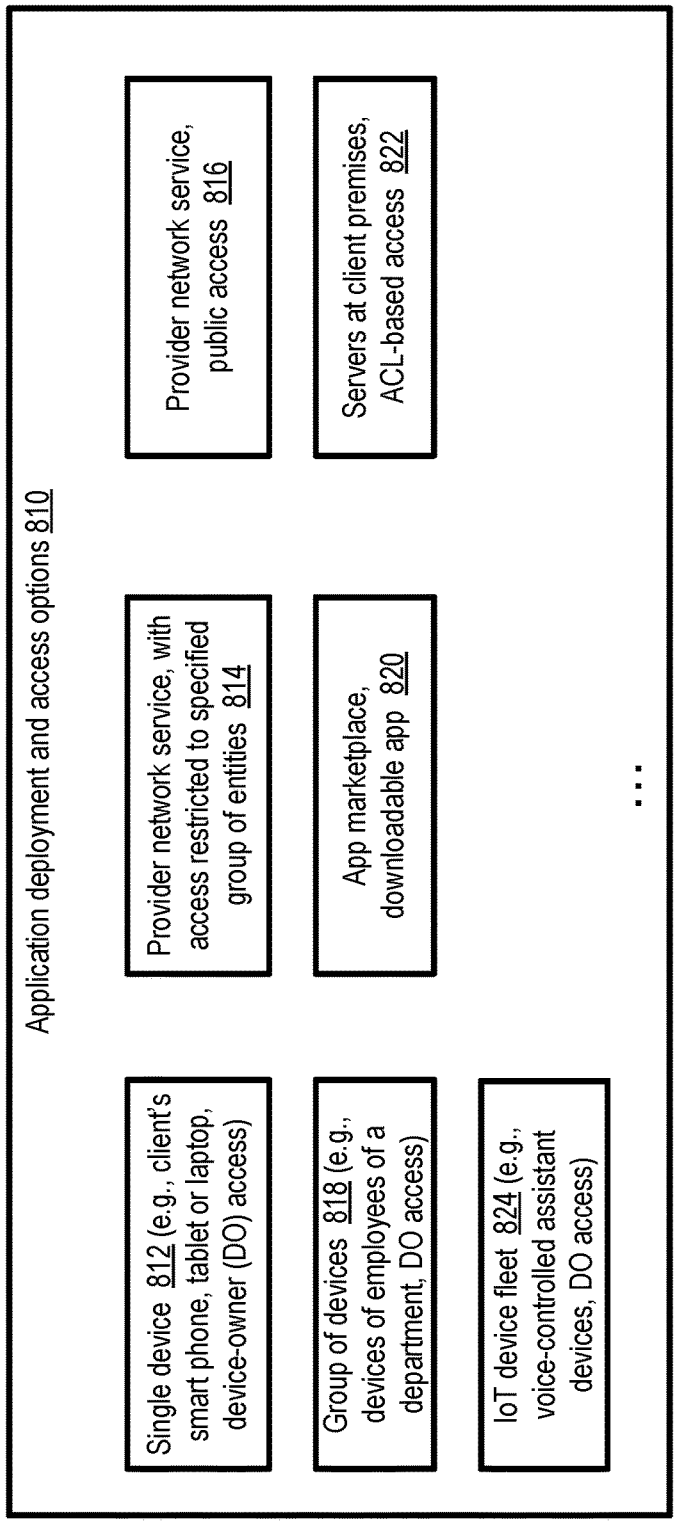
FIG. 8 illustrates example deployment and access options for automatically-generated applications, according to at least some embodiments.

FIG. 8 illustrates example deployment and access options for automatically-generated applications, according to at least some embodiments. In various embodiments, one or more executable versions of an automatically-generated application, tailored for respective types of execution platforms, may be produced at an AAGS at the request of a client. In at least some embodiments, for any given application generated on behalf of a client, the client may determine (a) the classes of devices (hardware and software combinations) on which the application is to be deployed (b) the particular devices on which the application is to be deployed and/or (c) access control rules for users of the application after it is deployed (e.g., which users are to be allowed to use the application and under what conditions they may use the application).

In the depicted embodiment, application deployment and access options 810 may include the option of running the application on a single device 812, such as the client's own smart phone, tablet computing device or laptop, with access granted only to the owner/user of the device. This level of access may be referred to as device owner or DO access. Option 812 may be used, for example, if the client does not wish to share the application with anyone else—e.g., if the application was intended to simplify some set of tasks that are of interest only to the client. In some embodiments, the client may wish to deploy the application to a group of devices 818, such as the devices of employees who work in a particular department of an organization, or the devices of a set of friends, with DO access being granted.

In various embodiments, the application may be deployed at the client's request to a provider network service, such as the virtualized computing service shown in FIG. 7, from which the application may for example be accessed using a web service interface (e.g., via a variant of the HyperText Transfer Protocol such as HTTPS). Several access modes may be supported for applications when they are deployed to a provider network service in some embodiments. In option 814, access may be restricted to a specified group of entities or clients of the service, for example, while in option 816, public access may be permitted.

In one embodiment, a set of servers at premises owned by the client (or by an organization to which the client belongs) may be selected as a deployment destination, as indicated in option 822. In one such embodiment, access control lists (ACLs) may be used to control access to the application when it is run at such servers. Other access control mechanisms may be used in other embodiments.

In one embodiment, as indicated in option 820, a version of an automatically-generated application may be included in an online application marketplace, from which it may be downloaded and run at various devices such as smart phones, tablets, and the like. The application may be downloaded without payment, or only after payment, depending on the objectives/wishes of the application owner (the client on whose behalf the application was generated). In at least one embodiment, a version of the application may be automatically deployed to a fleet 824 of Internet-of-things (IoT) devices, such as a fleet of voice-controlled assistant devices. Other deployment destination options may be supported in at least some embodiments.

Figure 9:
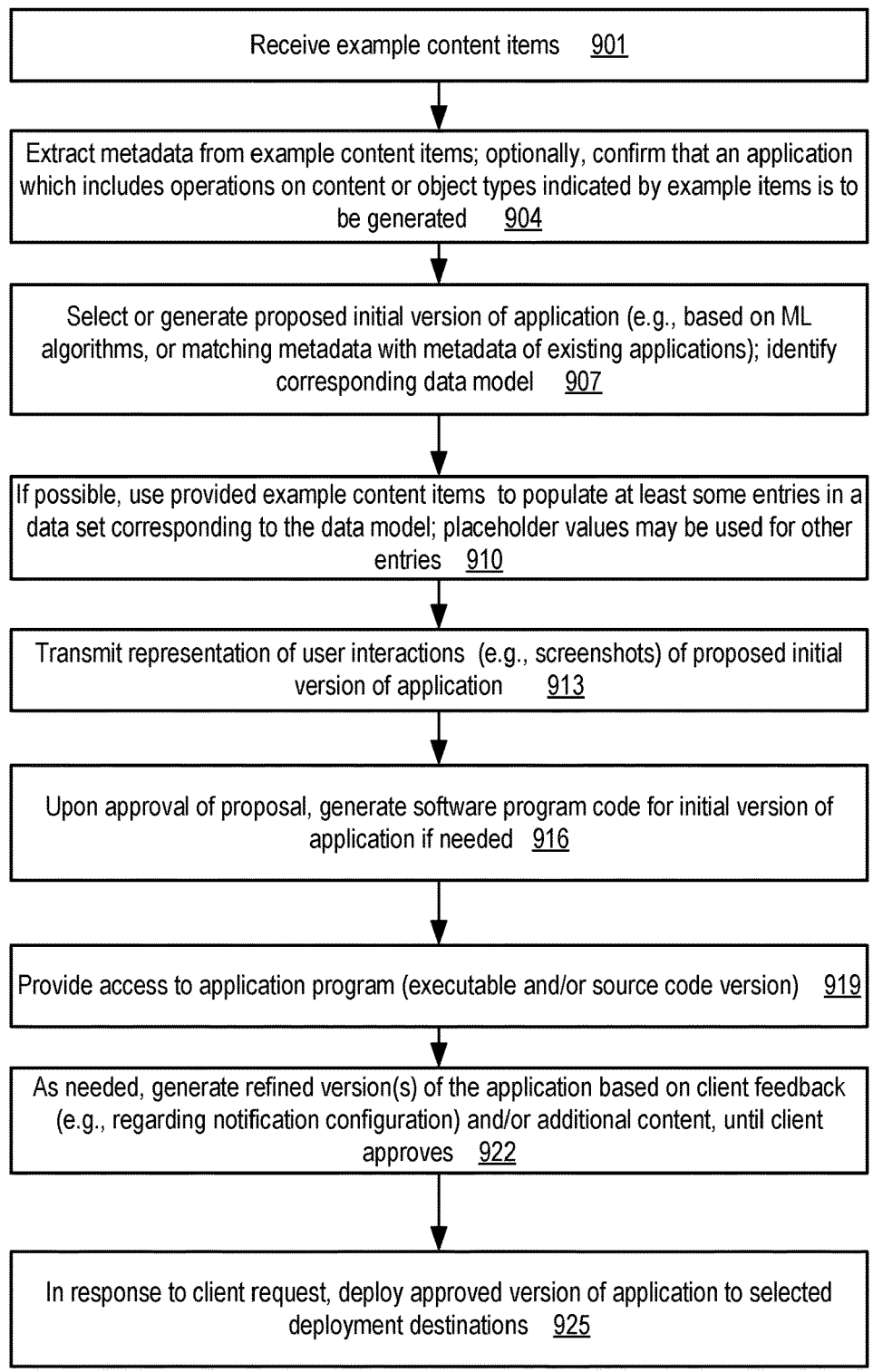
FIG. 9 is a flow diagram illustrating aspects of operations that may be performed to automatically generate software applications starting with the analysis of submitted content items, according to at least some embodiments.

Methods for Generating Software Applications Starting with Example Content Items FIG. 9 is a flow diagram illustrating aspects of operations that may be performed to automatically generate software applications starting with the analysis of submitted content items, according to at least some embodiments. As shown in element 901, a set of one or more example content items associated with a desired or targeted application may be received from a client in the depicted embodiment, e.g., at an application builder tool or service. From the perspective of the client, the submitted content items may represent examples of the categories of objects or content on which operations of the desired application would be performed— e.g., photographs of hair styles may be submitted to suggest that the application should include operations for scheduling hair styling appointments, photographs of houses may be submitted to suggest that the application is associated with real estate, and so on.

In various embodiments, metadata pertaining to the submission may be extracted from the example content items (element 904) and/or obtained from other sources (e.g., databases, knowledge bases or encyclopedias). The metadata may, for example, include the content type (photo, video, calendar entry etc.) as well as various characteristics or properties of the content examples (e.g., dates, locations, recognized objects types, etc.) in different embodiments. In some embodiments, the service or tool may utilize one or more programmatic interactions with the client to confirm that an application which includes operations on content categories or object types indicated by the example items is in fact to be generated.

One or more proposed initial versions of an application may be selected or generated based at least partly on the content and associated metadata (element 907). In some embodiments, the extracted metadata may be compared with respective metadata associated with a set of template applications maintained at the application generation tool/service, and the application(s) whose metadata have high degrees of similarity with the submitted content may be selected for further processing. In other embodiments, one or more machine learning models or algorithms (e.g., algorithms employing neural network-based models) may be used to generate or select the proposed application. Each candidate application may have an associated data model in the depicted embodiment, of which a concrete populated instance may be required for the application to function as intended.

An instance of a data set corresponding to the data model of a proposed initial version of the application may be initialized and populated. If possible, the provided example content items or their metadata may be used to populate at least some entries in the data set (element 910) in the depicted embodiment. Placeholder values may be used to fill out other entries (e.g., those entries for which values could not be obtained from the analysis of the submitted content) in some embodiments.

A representation (e.g., the equivalent of a sequence of screenshots) representing user interactions with the proposed initial version of the application may be transmitted to the client for approval in various embodiments. In some embodiments, the representation may include at least some non-visual elements (e.g., portions of audio may be included). Upon approval of the proposal, at least a portion of the software program code of the initial version of the application (which uses the populated data set) may be generated in some embodiments (element 916). It is noted that in some embodiments, there may be some scenarios in which no new code may have to be generated—e.g., a pre-existing application from an application builder service library may be sufficient for the client's needs; code may only have to be generated of needed.

An indication of the initial version of the program may be provided to the client in various embodiments (element 919). In some embodiments, the client may for example be permitted to try out or execute the initial version of the application (e.g., with access granted to run an executable version). In other embodiments, depending for example on the preferences of the client, access to the source code may also or instead be granted to the client.

Based on client feedback and input, additional operations associated with the application may be performed in various embodiments. For example, as needed, a sequence of one or more refined versions of the application program may be generated (element 922), based at least partly on additional content details provided by the client, notification configuration preferences indicated by the client for the target application, and so on. The process of iterative refinement based on client feedback may be continued until eventually an approved version of the application program is obtained in some embodiments. In some cases, clients may modify portions or all of the source code to implement various improvements or functional enhancements of the application as it is refined. Clients interested in modifying the software may not be required to take over modification responsibilities for the entire application source in at least some embodiments: for example, a client may make a minor change to one portion of the code, and then resume service-implemented refinement. Tools such as IDEs, source code repository management and the like may be provided by the application builder tool or service in various embodiments.

In at least some embodiments, indications of one or more deployment destination options for the automatically generated application maybe provided to the client at some stage of the interactions with the application builder tool or service. In response to a client request, an approved version of the application may be deployed to one or more selected deployment destinations in the depicted embodiment (element 925). In various embodiments, a fully functional scalable application may be generated and deployed on behalf of a client, starting with the analysis of content items submitted by the client, without requiring source code to be provided by the client.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of analyzing example content items submitted by a client, such as photographs, emails, and the like, using the results of the analysis to generate software applications on behalf of the client without requiring source code from the client, and then deploying the applications on any combination of desired application execution platforms, may be useful in a variety of scenarios. Numerous small business owners who are not experts in software development may for example obtain customized applications from an application builder service implementing the techniques. Individuals or groups who wish to organize and manage charitable events, school events, neighborhood events, small-scale sports events and the like may be able to automate part of their tasks using automatically generated applications. Even organizations or entities that possess programming expertise may benefit from the automated creation of applications, by using the application builder service or tool to implement some (e.g., less critical) parts of an application, while focusing their resources to other parts of the application where the greatest return on their in-house programming expertise can be obtained.

Illustrative Computer System

Figure 10:
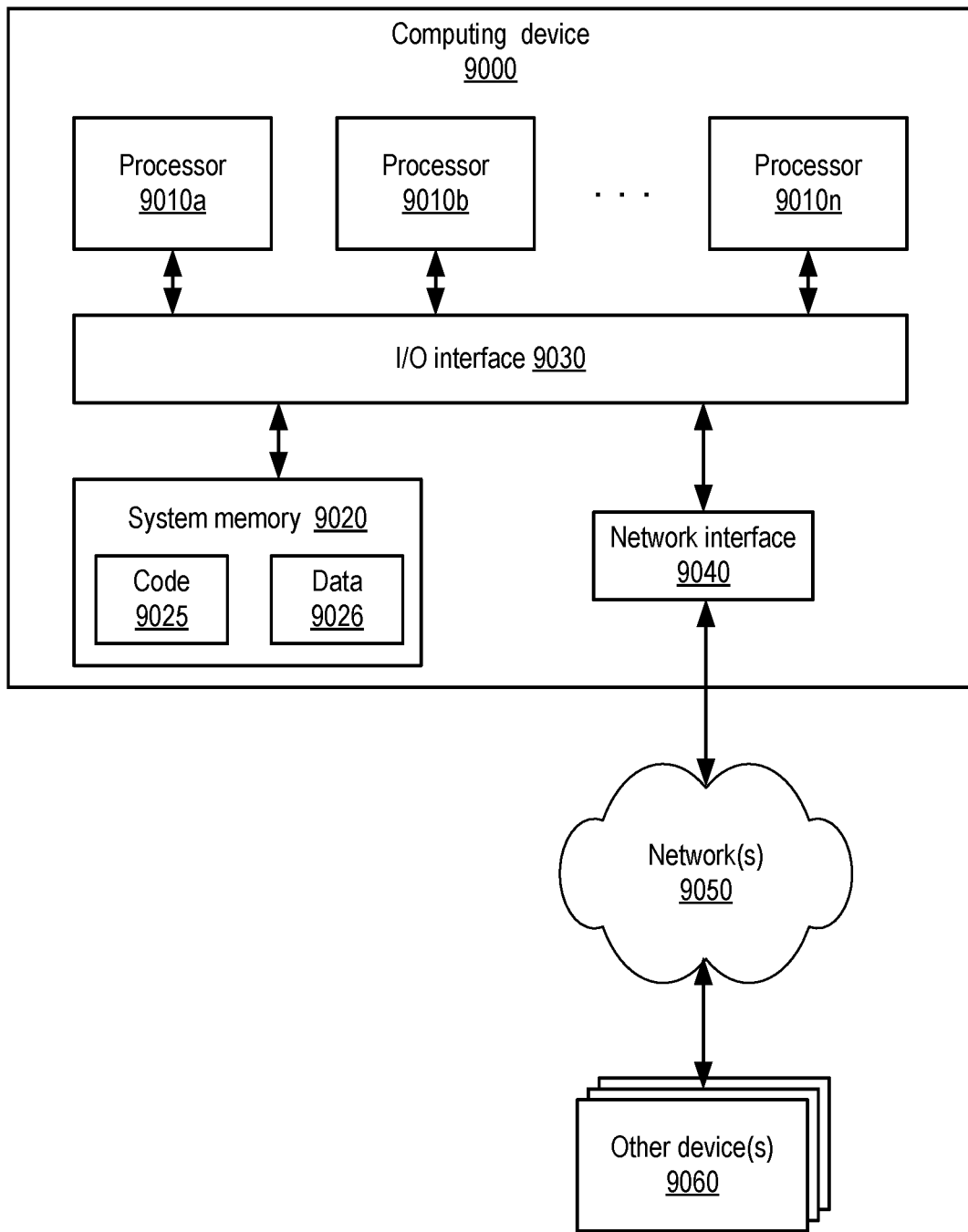
FIG. 10 is a block diagram illustrating an example computing device that may be used in at least some embodiments.

In at least some embodiments, a server that implements a portion or all of one or more of the technologies described herein, including the techniques for analyzing submitted content items, generating or selecting applications, refining applications, deploying applications and/or executing the deployed applications may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   receiving, via one or more programmatic interfaces at an application generation service, an indication of a set of content items to be analyzed to automatically generate an application on behalf of a client, without receiving source code of the application from the client;
   causing to be presented, by the application generation service via the one or more programmatic interfaces after a particular version of the application has been automatically generated based at least in part on analysis of the set of content items, an indication of a plurality of deployment options for the particular version; and
   causing, by the application generation service, the particular version to be deployed at a particular destination, wherein the particular destination is identified based at least in part on a particular deployment option which is selected from the plurality of deployment options via the one or more programmatic interfaces.

2. The computer-implemented method as recited in claim 1, wherein the particular destination comprises one or more of: (a) a smart phone, (b) a network-accessible service of a cloud computing environment, (c) a server, or (d) a collection of downloadable applications.

3. The computer-implemented method as recited in claim 1, further comprising:
   causing to be presented, by the application generation service via the one or more programmatic interfaces, a plurality of access mode options corresponding to the particular deployment option, wherein the plurality of access mode options includes a public access mode option and a restricted access mode option; and
   enabling access to the particular version in accordance with a particular access mode option selected from the plurality of access mode options via the one or more programmatic interfaces.

4. The computer-implemented method as recited in claim 1, wherein the set of content items includes one or more of: (a) a photograph, (b) a video, (c) an e-mail, (d) a contacts database entry, (e) an audio, (f) a presentation, (g) a document, (h) a calendar entry or (i) a sketch.

5. The computer-implemented method as recited in claim 1, further comprising:
   receiving an indication of at least one content item of the set of content items via one or more of: (a) a smart phone (b) a tablet computing device or (c) a wearable computing device.

6. The computer-implemented method as recited in claim 1, further comprising:
   storing, at the application generation service, metadata of a plurality of template applications;
   identifying, at the application generation service from the plurality of template applications, a particular template application based at least in part on an analysis of similarity of metadata of the particular template application with respect to metadata extracted from the set of content items; and
   utilizing, at the application generation service, the particular template application to prepare at least one version of the application.

7. The computer-implemented method as recited in claim 1, further comprising:
   populating, by the application generation service, an entry of a data set of the application with a placeholder value; and identifying, by the application generation service, a replacement value for the entry based at least in part on one or more interactions with the client.

8. A system, comprising:
one or more computing devices;
wherein the one or more computing devices include instructions that upon execution on or across the one or more computing devices:
receive, via one or more programmatic interfaces at an application generation service, an indication of a set of content items to be analyzed to automatically generate an application on behalf of a client, without receiving source code of the application from the client;
cause to be presented, by the application generation service via the one or more programmatic interfaces after a particular version of the application has been automatically generated based at least in part on analysis of the set of content items, an indication of a plurality of deployment options for the particular version; and
cause, by the application generation service, the particular version to be deployed at a particular destination, wherein the particular destination is identified based at least in part on a particular deployment option which is selected from the plurality of deployment options via the one or more programmatic interfaces.

9. The system as recited in claim 8, wherein the particular destination comprises one or more of: (a) a smart phone, (b) a network-accessible service of a cloud computing environment, (c) a server, or (d) a collection of downloadable applications.

10. The system as recited in claim 8, wherein the one or more computing devices include further instructions that upon execution on or across the one or more computing devices:
cause to be presented, by the application generation service via the one or more programmatic interfaces, a plurality of access mode options corresponding to the particular deployment option, wherein the plurality of access mode options includes a public access mode option and a restricted access mode option; and
enable access to the particular version in accordance with a particular access mode option selected from the plurality of access mode options via the one or more programmatic interfaces.

11. The system as recited in claim 8, wherein the set of content items includes one or more of: (a) a photograph, (b) a video, (c) an e-mail, (d) a contacts database entry, (e) an audio, (f) a presentation, (g) a document, (h) a calendar entry or (i) a sketch.

12. The system as recited in claim 8, wherein the one or more computing devices include further instructions that upon execution on or across the one or more computing devices:
receive an indication of at least one content item of the set of content items via one or more of: (a) a smart phone (b) a tablet computing device or (c) a wearable computing device.

13. The system as recited in claim 8, wherein the one or more computing devices include further instructions that upon execution on or across the one or more computing devices:
store, at the application generation service, metadata of a plurality of template applications;

identify, at the application generation service from the plurality of template applications, a particular template application based at least in part on an analysis of similarity of metadata of the particular template application with respect to metadata extracted from the set of content items; and
utilize, at the application generation service, the particular template application to prepare at least one version of the application.

14. The system as recited in claim 8, wherein the one or more computing devices include further instructions that upon execution on or across the one or more computing devices:
populate, by the application generation service, an entry of a data set of the application with a placeholder value; and
identify, by the application generation service, a replacement value for the entry based at least in part on one or more interactions with the client.

15. One or more non-transitory computer-accessible storage media storing program instructions that when executed on or across one or more processors cause the one or more processors to:
receive, via one or more programmatic interfaces at an application generation service, an indication of a set of content items to be analyzed to automatically generate an application on behalf of a client, without receiving source code of the application from the client;
cause to be presented, by the application generation service via the one or more programmatic interfaces after a particular version of the application has been automatically generated based at least in part on analysis of the set of content items, an indication of a plurality of deployment options for the particular version; and
cause, by the application generation service, the particular version to be deployed at a particular destination, wherein the particular destination is identified based at least in part on a particular deployment option which is selected from the plurality of deployment options via the one or more programmatic interfaces.

16. The one or more non-transitory computer-accessible storage media as recited in claim 15, wherein the particular destination comprises one or more of: (a) a smart phone, (b) a network-accessible service of a cloud computing environment, (c) a server, or (d) a collection of downloadable applications.

17. The one or more non-transitory computer-accessible storage media as recited in claim 15, storing further program instructions that when executed on or across one or more processors cause the one or more processors to:
cause to be presented, by the application generation service via the one or more programmatic interfaces, a plurality of access mode options corresponding to the particular deployment option, wherein the plurality of access mode options includes a public access mode option and a restricted access mode option; and
enable access to the particular version in accordance with a particular access mode option selected from the plurality of access mode options via the one or more programmatic interfaces.

18. The one or more non-transitory computer-accessible storage media as recited in claim 15, wherein the set of content items includes one or more of: (a) a photograph, (b) a video, (c) an e-mail, (d) a contacts database entry, (e) an audio, (f) a presentation, (g) a document, (h) a calendar entry or (i) a sketch.

19. The one or more non-transitory computer-accessible storage media as recited in claim 15, storing further program instructions that when executed on or across one or more processors cause the one or more processors to:
  receive an indication of at least one content item of the set of content items via one or more of: (a) a smart phone (b) a tablet computing device or (c) a wearable computing device.

20. The one or more non-transitory computer-accessible storage media as recited in claim 15, storing further program instructions that when executed on or across one or more processors cause the one or more processors to:
  store, at the application generation service, metadata of a plurality of template applications;
  identify, at the application generation service from the plurality of template applications, a particular template application based at least in part on an analysis of similarity of metadata of the particular template application with respect to metadata extracted from the set of content items; and
  utilize, at the application generation service, the particular template application to prepare at least one version of the application.

* * * * *